United States Patent [19]
Solomon

[11] 3,843,732
[45] Oct. 22, 1974

[54] PREPARATION OF CARBONYL COMPOUNDS

[75] Inventor: Paul W. Solomon, Bartlesville, Okla.

[73] Assignee: Phillips Petroleum Company, Bartlesville, Okla.

[22] Filed: Oct. 21, 1971

[21] Appl. No.: 191,473

[52] U.S. Cl. .......... 260/599, 260/603 HF, 260/592, 260/596
[51] Int. Cl. ............................................ C07c 45/04
[58] Field of Search .................................... 260/599

[56] References Cited
UNITED STATES PATENTS

| | | | |
|---|---|---|---|
| 2,753,377 | 7/1956 | Richter | 260/599 |
| 3,385,897 | 5/1968 | Vanderwerff | 260/599 |
| 3,423,466 | 1/1969 | Guyer et al. | 260/599 |
| 3,485,876 | 12/1969 | Van de Mond | 260/599 |

*Primary Examiner*—Bernard Helfin

[57] ABSTRACT

A method of oxidizing methylated aromatics, alcohols and alkenyl aromatics to produce aldehydes or ketones employing a Group Ia or IIa metal/-Sn/P/O catalyst.

4 Claims, No Drawings

PREPARATION OF CARBONYL COMPOUNDS

This invention relates to the preparation of carbonyl compounds.

In one of its more specific aspects, this invention relates to the catalytic oxidation of methylated aromatics, alcohols, and alkenyl aromatics to produce aldehydes and/or ketones.

The catalytic oxidation of methylated aromatics, alcohols, or alkenyl aromatics is effected by catalysts such as a Group Ia or IIa metal/Sn/P/O catalyst comprising about 0.1 to about 10 weight percent of Group Ia or Group IIa metal, preferably lithium, from about 0.1 to about 16 weight percent phosphorus and from about 15 to about 75 weight percent tin. The balance of the catalyst consists essentially of oxygen in an amount sufficient to satisfy the valence requirements of the aforecited substances.

This catalyst can be prepared by coprecipitating stannous chloride and phosphoric acid with ammonia. The precipitate is washed, dried, preferably shaped into pellets and then calcined at a temperature between about 900° and about 1,500° F for about 5 hours. Thereafter, the pellets can be impregnated with lithium employing an aqueous solution of a lithium salt, such as lithium nitrate, to incorporate the recited amount of lithium in the pellets which is then dried and calcined.

In the method of this invention, at least one of a methylated aromatic, an alcohol and an alkenyl aromatic material contained in a feed stream is contacted with a catalyst consisting essentially of a metal of Group Ia or IIa, tin, phosphorus and oxygen under oxidizing condition to produce at least one of an aldehyde or a ketone. It is to be understood that mixtures of the methylated aromatics, alcohols and alkenyl aromatics can be used to produce a product comprising a mixture of aldehydes and ketones.

The invention is applicable to methylated aromatics of the general formula $Ar(CH_3)_n$, in which Ar is an aromatic radical having a valence of n and contains 6 to 18 carbon atoms, and n is an integer having a value within the range of 1 to 4. Among the methylated aromatics to which this invention is applicable are materials such as toluene, alpha-methylnaphthalene, o-xylene, m-xylene, p-xylene, 9-methylanthracene, 3,5-diphenyltoluene, 2,3,6,7-tetramethylnaphthalene, mesitylene, beta-methylnaphthalene, and the like.

The invention is applicable to alcohols of the formula

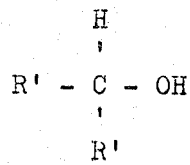

in which R' is selected from the group consisting of hydrogen, alkyl, alkaryl, aralkyl and aryl groups, these groups containing from 1 to about 30 carbon atoms. Among the alcohols to which this invention is applicable are methanol, diphenyl carbinol, benzyl alcohol, alpha-phenylethanol, 2,2,4,4-tetramethylpentan-3-ol, di-beta-naphthyl carbinol, n-heptyl alcohol, p-tolyl carbinol, 2-methyl-2-phenylpropan-1-ol, and the like.

The invention is applicable to alkenyl aromatics of the general formula

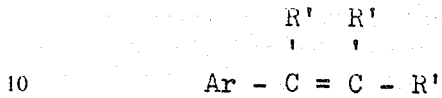

in which Ar is an aryl group containing from about 6 to about 18 carbon atoms and R' is selected from the group consisting of hydrogen, alkyl, alkaryl, aralkyl and aryl groups having from about 8 to about 30 carbon atoms. Among the alkenyl aromatics to which this invention is applicable are styrene, alpha-vinylnaphthalene, alpha-methylstyrene, 3,5-diphenylstyrene, stilbene, 1,1-diphenylethylene, 2,3-diphenylbutene-2, 1,2-di-beta-naphthylethylene, 3,5-di-p-tolylstyrene, and the like.

In the method of this invention the oxidation is conducted under reaction conditions including a temperature of from about 700° to about 1,300° F, a pressure within the range of about 0.05 to about 250 psia, an aromatic feed space velocity within the range of from about 0.1 to about 20 liters of total gas per liter of catalyst per second (l/l/s), air to aromatic feed ratios within the range of about 1,000 to about 7500 vols./vol. and steam to aromatic feed ratios within the range of about 10 to about 7,500 vols./vol.

The method of the invention as directed to each of the aforementioned feedstocks is illustrated by the following examples.

EXAMPLE I

The invention as applied to a methylated aromatic was carried out within the conditions previously described by contacting p-xylene with a lithium/tin/phosphorus/oxygen catalyst to produce a mixture of aldehydes. The catalyst contained about 1.42 weight percent lithium, about 10.6 weight percent phosphorus, about 65 weight percent tin, the balance being oxygen. Reaction conditions and results were as follows:

| Reaction Conditions | | Product Analysis, Mole % | |
|---|---|---|---|
| p-Xylene, ml/hr. | 4 | Benzene | 3 |
| Air, l/hr. | 155 | Toluene | 7 |
| Water, ml/hr. | 200 | Benzaldehyde | 6 |
| Total Space Velocity, l/l/sec. | 11 | p-Tolualdehyde | 32 |
| Temperature, °F. | 1000 | Terephthaldehyde | 31 |
| Conversion, % | 18 | Nonaromatics | 3 |
| | | CO, CO$_2$ | 18 |

These data indicate that the method of this invention is effective in oxidizing methylated aromatics to aldehydes.

In similar runs with methylated aromatics, o-xylene is convertible to o-tolualdehyde and m-xylene is converted to m-tolualdehyde.

EXAMPLE II

The invention as applied to alcohols was carried out within conditions previously described by contacting benzyl alcohol with a lithium/tin/phosphorus/-oxygen catalyst to produce benzaldehyde. The catalyst was the same as that employed in Example I and operating conditions and results were as follows:

| Reaction Conditions | | Product Analysis, Mole % | |
|---|---|---|---|
| Benzyl alcohol, ml/hr. | 4 | Benzene | 15 |
| Air, l/hr. | 100 | Toluene | 2 |
| Water, ml/hr. | 100 | Benzaldehyde | 58 |
| Total Space Velocity, 1/1/sec. | 6.2 | CO, $CO_2$ | 25 |
| Temperature, °F. | 1000 | | |
| Conversion, % | 100 | | |

These data indicate that the method of this invention is employable for the production of aldehydes from alcohols.

EXAMPLE III

The invention as applied to alkenyl aromatics was carried out within conditions previously described by contacting styrene with a lithium/tin/phosphorus/oxygen catalyst to produce benzaldehyde and acetophenone. The catalyst was the same as that employed in Examples I and II, and operating conditions and results were as follows:

| Reaction Conditions | | Product Analysis, Mole % | |
|---|---|---|---|
| Styrene, ml/hr. | 4 | Benzene | 24 |
| Air, l/hr. | 100 | Benzaldehyde | 42 |
| Water, ml/hr. | 100 | Acetophenone | 1 |
| Total Space Velocity, 1/1/sec. | 6.2 | CO, $CO_2$ | 33 |
| Temperature, °F. | 1050 | | |
| Conversion, % | 35 | | |

These data indicate that the method of this invention is effective in oxidizing alkenyl aromatics to aldehydes and ketones.

It will be evident from the foregoing that various modifications can be made to the method of this invention. Such modifications are considered, however, to be within the scope of the invention.

What is claimed is:

1. A method for the vapor-phase catalytic oxidation of methylated aromatics having the formula $Ar(CH_3)_n$ in which Ar is an aromatic radical having a valence of n containing 6 to 18 carbon atoms, and n is an integer in the range of 1 to 4 contained in a feed stream which comprises contacting said feed stream, air, and steam at an elevated temperature sufficient to maintain the reactants under vapor-phase oxidizing conditions with a lithium-tin-phosphorus-oxygen catalyst consisting essentially of about 0.1 to about 10 weight percent lithium, from about 15 to about 75 weight percent tin, from about 0.1 to about 16 weight percent phosphorus, wherein said amounts of lithium, tin and phosphorus total less than 100 percent, and the balance of said catalyst being combined oxygen in sufficient amount to bring the total catalyst composition to 100 weight percent, to convert said aromatics to aldehydes.

2. The method of claim 1 in which said methylated aromatics are selected from p-xylene, m-xylene or o-xylene.

3. The method of claim 1 in which said feed stream is contacted with said catalyst at a temperature within the range of about 700°F to about 1,300°F, a pressure within the range of about 0.05 to about 250 psia, a space velocity within the range of from about 0.1 to about 20 liters of total gas per liter of catalyst per second (1/1/s), an air to aromatic feed ratio within the range of about 1,000 to about 7,500 vols./vol., and a steam to aromatic feed ratio within the range of about 10 to about 7,500 vols./vol.

4. A method according to claim 1 wherein said methylated aromatic is p-xylene.

* * * * *